US011172488B2

(12) United States Patent
Gustavsson et al.

(10) Patent No.: US 11,172,488 B2
(45) Date of Patent: Nov. 9, 2021

(54) POWER AMPLIFIER-AWARE USER SCHEDULING

(71) Applicant: Telefonaktiebolaget LM Ericsson (publ), Stockholm (SE)

(72) Inventors: Ulf Gustavsson, Gothenburg (SE); Erik Larsson, Linköping (SE); Christopher Mollén, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 23 days.

(21) Appl. No.: 16/483,767

(22) PCT Filed: Mar. 8, 2017

(86) PCT No.: PCT/EP2017/055383
§ 371 (c)(1),
(2) Date: Aug. 6, 2019

(87) PCT Pub. No.: WO2018/162052
PCT Pub. Date: Sep. 13, 2018

(65) Prior Publication Data
US 2019/0373616 A1 Dec. 5, 2019

(51) Int. Cl.
*H04W 72/08* (2009.01)
*H04B 7/0452* (2017.01)
(Continued)

(52) U.S. Cl.
CPC ........ *H04W 72/082* (2013.01); *H04B 7/0452* (2013.01); *H04W 72/046* (2013.01); *H04W 72/10* (2013.01)

(58) Field of Classification Search
CPC . H04W 72/082; H04W 72/046; H04W 72/10; H04B 7/0452
See application file for complete search history.

(56) References Cited

U.S. PATENT DOCUMENTS 9,871,607 B1* 1/2018 Perets ................. H04L 27/2657
2002/0177427 A1* 11/2002 Nadgauda ................. H04L 1/06
455/403

(Continued)

OTHER PUBLICATIONS

Mollé, C. et al., "Out-of-Band Radiation Measure for MIMO Arrays with Beamformed Transmission", 2016 IEEE International Conferences on Communication, May 22, 2016, pp. 1-6, IEEE.

(Continued)

*Primary Examiner* — Kevin M Cunningham
(74) *Attorney, Agent, or Firm* — Coats + Bennett, PLLC

(57) ABSTRACT

The present disclosure relates to a method (100) for determining scheduling assignments for reducing nonlinear signal distortion, performed in a network node of a wireless communications network. The network node comprises an antenna array arranged to perform beamforming. The method (100) comprises obtaining (S10) channel state information, CSI, relating to respective channels between the network node and at least two wireless devices served by the network node. The method further comprises determining (S20) precoding vectors to the at least two wireless devices based on the obtained CSI. The method also comprises determining (S30) at least two frequency scheduling assignments for each of the at least two wireless devices. The method additionally comprises estimating (S40), for each of the determined at least two frequency scheduling assignments, a respective transmitted nonlinear signal distortion to each of the at least two wireless devices based on the obtained CSI. The method yet further comprises selecting (S50) a frequency scheduling assignment of the determined at least two frequency scheduling assignments based on the estimated transmitted nonlinear signal distortions. The present disclosure also relates to corresponding network nodes and computer programs.

13 Claims, 6 Drawing Sheets

(51) Int. Cl.
*H04W 72/04* (2009.01)
*H04W 72/10* (2009.01)

(56) References Cited

U.S. PATENT DOCUMENTS

| | | | |
|---|---|---|---|
| 2006/0269023 A1* | 11/2006 | Chimitt | H04B 1/1036 |
| | | | 375/350 |
| 2009/0067382 A1* | 3/2009 | Li | H04L 5/0037 |
| | | | 370/330 |
| 2010/0220601 A1* | 9/2010 | Vermani | H04L 1/0025 |
| | | | 370/248 |
| 2014/0307664 A1 | 10/2014 | Chen et al. | |
| 2015/0003406 A1 | 1/2015 | Athley et al. | |
| 2015/0105025 A1* | 4/2015 | Zhang | H04B 7/063 |
| | | | 455/63.4 |
| 2015/0200718 A1 | 7/2015 | Sajadieh et al. | |

OTHER PUBLICATIONS

Mollén C. et al., "Out-of-Band Radiation from Large Antenna Arrays", arXiv.org, Nov. 7, 2016, pp. 1-13, Cornell University.

\* cited by examiner

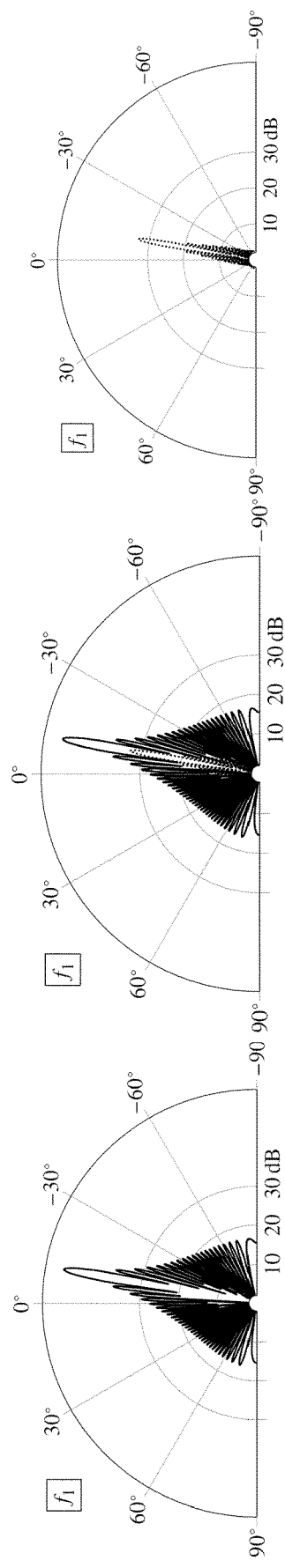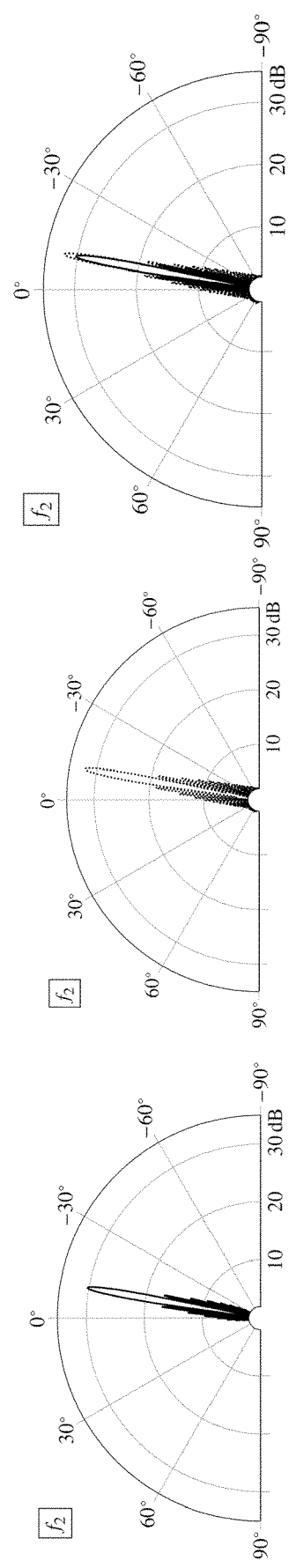

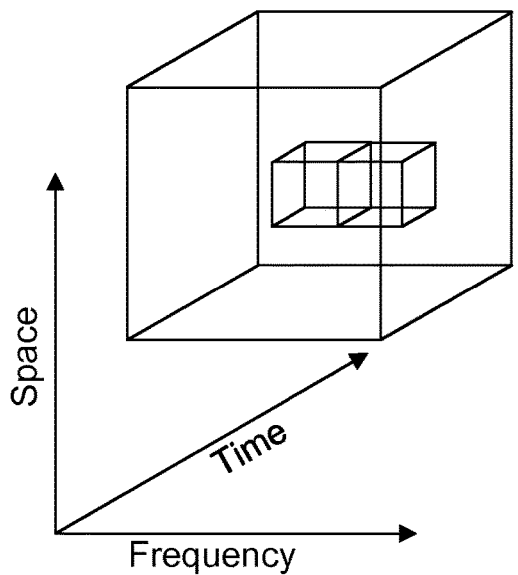
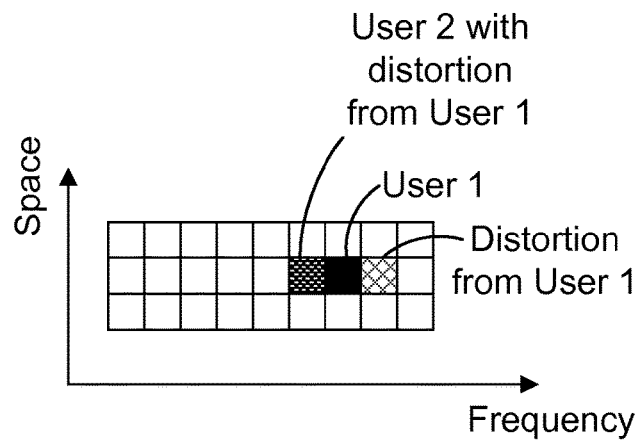
Fig. 3a
Fig. 3b
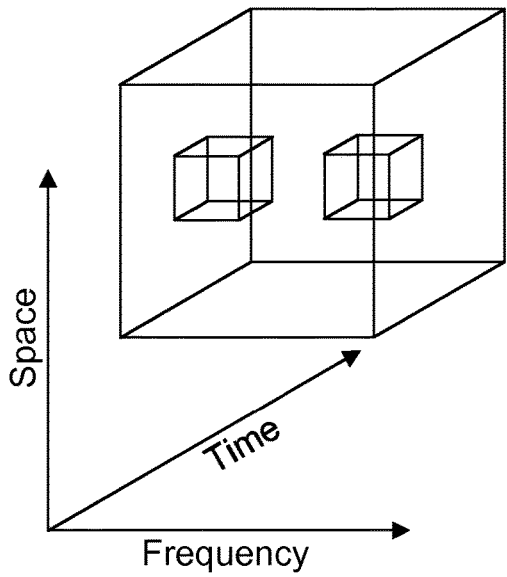
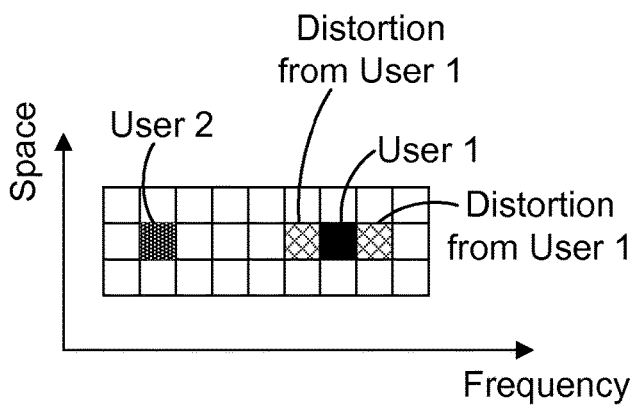
Fig. 3c
Fig. 3d

POWER AMPLIFIER-AWARE USER SCHEDULING

TECHNICAL FIELD

The present disclosure relates to the field of wireless communication. In particular, it relates to scheduling for beamformed self-interference mitigation due to nonlinear signal distortion.

BACKGROUND

Massive multiple input multiple output, MIMO, is a key technology component in next generation wireless communication. Most published work until now has however mostly considered massive MIMO for providing large improvements for enhanced mobile broadband, eMBB.

There are however numerous other use cases within new radio, NR, which may be addressed to some extent with massive MIMO, provided that we may deploy suitable algorithms for pre-coding etc. Examples of such use cases may be massive machine type communication, M-MTC, in which an extremely large number of sensors needs to communicate over a narrow bandwidth with a network node such as a base-station, or critical machine type communication, C-MTC/ultra-reliable low latency communication, URLLC, referring to applications such as traffic safety/control, control of critical infrastructure and wireless connectivity for industrial processes.

If a massive MIMO network node serving a plurality of wireless devices utilizes low complexity radios with limited linearity performance beamformed self-interference, which stems from nonlinear signal distortion, potentially reduces the signal to noise ratio, SINR for a given user. In the use cases of M-MTC or C-MTC/URLLC, such reduction of the SINR may have catastrophic consequences, e.g. in the form of accidents when coordinating automated devices using M-MTC or performing remote surgery using C-MTC/URLLC. There is thus a need in the art for reducing or eliminating beamformed self-interference.

SUMMARY

One object of the present disclosure is to provide a method which seeks to mitigate, alleviate, or eliminate one or more of the above-identified deficiencies in the art and disadvantages singly or in any combination and to provide a method for determining scheduling assignments for reducing nonlinear signal distortion.

This object is obtained by a method, performed in a network node of a wireless communications network, the network node comprising an antenna array arranged to perform beamforming, for determining scheduling assignments for reducing nonlinear signal distortion. The method comprises obtaining channel state information, CSI, relating to respective channels between the network node and at least two wireless devices served by the network node. The method further comprises determining precoding vectors to the at least two wireless devices based on the obtained CSI. The method also comprises determining at least two frequency scheduling assignments for each of the at least two wireless devices. The method additionally comprises, for each of the determined at least two frequency scheduling assignments, estimating a respective transmitted nonlinear signal distortion to each of the at least two wireless devices based on the obtained CSI. The method yet further comprises selecting a frequency scheduling assignment of the determined at least two frequency scheduling assignments based on the estimated transmitted nonlinear signal distortions. The disclosed method mitigates distortion due to nonlinear hardware by scheduling users with similar channels to different parts of the spectrum. This may result in an increase in spectral efficiency. Since the effects of distortion are compensated by scheduling rather than additional hardware or software compensation mechanisms, the method potentially enables the use of utilizing amplifiers having high efficiency, low linearity and reduced complexity compared to the amplifiers needed if distortion was not compensated for by scheduling users with similar channels, i.e. when two or more users served by the network node are located in essentially the same direction with respect to the network node (and the beamformed lobes to the respective users therefore being similar), to different parts of the spectrum. In other words, the method enables the linearity requirement for large arrays to be relaxed compared to legacy systems. Specifically, less stringent linearity requirements on each transmitter make it possible to build large arrays from low-complexity, high efficiency hardware. The use of low-complexity hardware to build large arrays is very beneficial for cost reasons. Furthermore, the method does not require more spectrum compared to current methods of scheduling. Rather, the method relies on improving current methods of scheduling.

According to some aspects, estimating the respective transmitted nonlinear signal distortion comprises determining a signal to noise and distortion, SINAD, ratio. SINAD provides a measure of distortion for a given frequency scheduling which is quick and easy to estimate. Furthermore, SINAD, though it may be defined in different ways, is an established concept, and using it may facilitate the implementation of the disclosed method as well as providing a well-understood measure of the impact of nonlinear distortion for different frequency scheduling assignments.

According to some aspects, selecting a frequency scheduling assignment comprises selecting the frequency scheduling assignment that yields the highest signal to noise and distortion, SINAD, ratio for at least one of the at least two wireless devices. By selecting the frequency scheduling assignment that yields the highest SINAD for at least at one of the at least two wireless devices enables mitigation of distortion caused by transmission to a first wireless device at a first power on transmission to a second wireless device at a second power lower than the first power.

According to some aspects, selecting a frequency scheduling assignment comprises selecting the frequency scheduling assignment based on a priority status of at least one of the at least two wireless devices. A priority status enables trade-offs between nonlinear distortion reduction and priorities of different wireless devices, such as wireless devices associated with law enforcement or a prioritized subscriber.

According to some aspects, the method further comprises transmitting information relating to the selected frequency scheduling assignment to the at least two wireless devices. By informing the wireless devices, the wireless devices do not need to scan the band to identify the selected frequency scheduling assignment.

According to some aspects, estimating the respective transmitted nonlinear signal distortion comprises determining channel vectors representing respective channels between the network node and the at least two wireless devices based on the obtained CSI. The channel vectors enable taking the effects of similarity between channels into effect when determining the transmitted nonlinear distortion.

According to some aspects, estimating the respective transmitted nonlinear signal distortion comprises computing a cost function, wherein the cost function is arranged to provide a measure of distortion influence between subcarriers of the at least two wireless devices. Adopting a cost function enables evaluating the effects of nonlinear distortion of different frequency scheduling assignments. A cost function enables flexible tailoring of how the transmitted nonlinear signal distortion is estimated. Different cost functions may be provided for emphasis of how different aspects of the nonlinear distortion shall be prioritized or estimated. Being able to estimate the nonlinear signal distortion in different ways allows for different trade-offs between computational cost and desired accuracy.

According to some aspects, the cost function is based on at least one of channel vectors representing respective channels between the network node and the at least two wireless devices, spectral masks for the at least two frequency scheduling assignments for the at least two wireless devices and the transmit power to the at least two wireless devices. Basing the cost function on channel vectors enables taking the similarity of channels into account when estimating the nonlinear signal distortion. Basing the cost function on spectral masks enables taking into account the power contained in a specified frequency bandwidth at certain offsets, relative to the total carrier power, which is related to nonlinear signal distortion between neighbouring channels. Since the nonlinear signal distortion from a first channel to a second channel is related to the transmit power of the first channel, basing the cost function on the transmit power to the at least two wireless devices enables estimating the magnitude to which nonlinear signal distortion generated in one channel causes signal distortion in another channel. In particular, the combination of basing the cost function of the channel vectors, the spectral masks and the respective transmit powers enables estimating the signal distortion between similar channels, with "similar" being described at least in part by the channel vectors, and the spectral masks and the respective transmit powers describe how transmit power from a distribution of subcarriers leaks out to adjacent subcarriers in the form of nonlinear signal distortion.

According to some aspects, computing the cost function comprises estimating channel vector orthogonality between channel vectors between the network node and the at least two wireless devices. Channel vector orthogonality provides a well-defined measure of how similar the channels are. Furthermore, channel vector orthogonality needs only the channel vectors.

According to some aspects, computing the cost function comprises estimating a norm of the channel vectors. The channel vector norms may be reused for further beamforming purposes, e.g. using channel norm feedback strategies for beamforming.

According to some aspects, determining the at least two frequency scheduling assignments comprises assigning each wireless device on respective sets of consecutive subcarriers. By scheduling a wireless device within a band of consecutive subcarriers, nonlinear signal distortion to other wireless devices on similar channels during transmission to the wireless device will occur mainly at the edges of the band of the consecutive subcarriers. Scheduling both wireless devices on consecutive subcarriers enables minimizing nonlinear signal distortion between the wireless devices by scheduling the respective bands far apart in frequency.

According to some aspects, the method further comprises transmitting at least one radio signal via the antenna array to at least one of the at least two wireless devices.

The present disclosure also relates to a network node of a wireless communications network. The network node comprises an antenna array arranged to perform beamforming. The network node is arranged to carry out the method for determining scheduling assignments for reducing self-interference as described above and below, and has all the technical effects and advantages of the disclosed method.

The present disclosure also relates to a computer program comprising computer code which, when executed, causes a network node according as described above and below to carry out the method for determining scheduling assignments for reducing self-interference as described above and below, and has all the technical effects and advantages of the disclosed method.

BRIEF DESCRIPTION OF THE DRAWINGS

FIGS. 2 a-f illustrate the reason for the potential nonlinear distortion between adjacent channels of FIG. 1;

FIGS. 3 a-d illustrate two different frequency scheduling assignments and the inventive concept;

DETAILED DESCRIPTION

Figure 1:
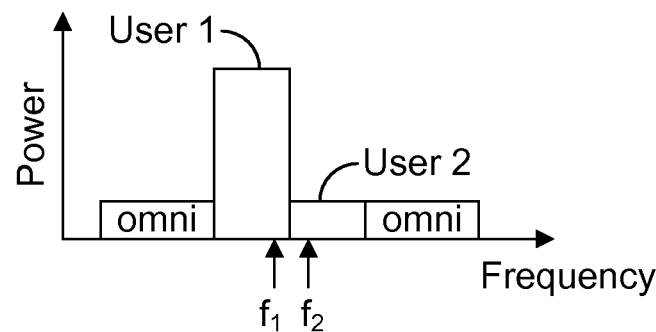
FIG. 1 illustrates a frequency scheduling assignment having potential nonlinear distortion between adjacent channels.

FIG. 1 illustrates a frequency scheduling assignment having potential nonlinear distortion between adjacent channels. The situation illustrated in FIG. 1 will be used as a starting point for the understanding of how nonlinear signal distortion might arise in antenna array beamforming to a plurality of users, the understanding of which will be used for the inventive concept of the present disclosure to mitigate said nonlinear signal distortion. FIG. 1 shows the transmit power in downlink to two separate wireless devices, user 1 and user 2, having similar channels. User 1 and user 2 are scheduled close in frequency, e.g. having two adjacent subcarriers $f_1$ and $f_2$ respectively. The rest of the spectrum is occupied by omni-directional transmission. Furthermore, the transmit power to user 1 is much greater than the transmit power to user 2. What constitutes similar channels, close in frequency and one transmit power being much greater than another transmit power will, for the purposes of illustration, be determined by the resulting nonlinear signal distortion user 1 has on the desired signal to user 2. It has been found that the radiation pattern of a signal can be split up into the sum of the desired, linearly amplified signal and the uncorrelated distortion, wherein the distortion from nonlinear hardware is beamformed in the same direction as the desired signal. This beamforming leaks out also to adjacent frequencies and a strong beamformed signal will cause significant distortion in certain directions also in neighbouring channels. This is described further below in relation to FIGS. 2a-f, which describes the observed effects for the situation illustrated in FIG. 1.

FIG. 2a illustrates the desired signal to user 1. Nonlinear hardware will give rise to distortion, which is beamformed in the same direction as the desired signal of FIG. 2a. The sum of the desired signal to user 1 and the nonlinear distortion is illustrated in FIG. 2b. FIG. 2c illustrates the nonlinear distortion to user 1 by itself. The nonlinear distortion is beamformed in the same direction as the desired signal. Furthermore, the magnitude of the distortion depends on the transmit power of the desired signal. FIG. 2d illustrates how the distortion from user 1 as illustrated at frequency $f_1$ leaks out to adjacent frequency $f_2$, which is used to transmit to user 2. FIG. 2e illustrates the desired signal to user 2 at frequency $f_2$. The signal to user 2 is beamformed in essentially the same direction as the signal to user 1, but at a lower magnitude. The signal strength to user 2 reaches a maximum just over 30 dB, which is about the same magnitude as the distortion from the signal to user 2. The sum of the distortion from the signal to user 2 on the signal to user 1 is illustrated in FIG. 2f. The signal to user 1 is drowned in distortion. Thus, if two users are served on similar channels and have frequency scheduling assignments that are close in frequency, distortion from transmissions over one channel may distort signals on the adjacent channel. Since the transmit power has a significant impact on the magnitude of the distortion, the relative transmit powers between similar channels may also become important, as illustrated above where the transmission power to user 1 is much higher than the transmission power to user 2. The resulting distortion, albeit much weaker relative to the transmit power to user 1 end up comparable in magnitude to the transmit power to user 2, thereby drowning the signal to user 2 in distortion. The main principle of the inventive concept of how to mitigate such distortion is illustrated in relation to FIGS. 3a-d, below.

FIGS. 3 a-d illustrate two different frequency scheduling assignments and the inventive concept. The central idea of the inventive concept is to schedule users having similar channels, i.e. being assigned similar spatial resources, such that they are separated in frequency in such a manner that distortion leakage from one channel into another is mitigated. FIG. 3a illustrates a first resource assignment for respective sets of subcarriers of two different users. Each set is illustrated by a respective box. Since the inventive concept relates to beamformed self-interference, the scheduling comprises spatial resources in addition to frequency and time resources. For illustrative purposes, the spatial resources associated with the respective sets of subcarriers are shown as identical, but the concept of similar channels is broader, as will be elaborated further below. The respective sets of subcarriers are also assigned time and frequency resources. In FIG. 3a, the time resources are illustrated as identical, and the respective sets of subcarriers are assigned to respective bands that are arranged adjacent to each other. If we have a situation similar to that described in relation to FIGS. 1 and 2a-f, where transmission to a first user, user 1, occurs at a transmit power that is significantly greater than a transmit power to a second user, user 2, a situation as illustrated in FIG. 3b may occur. FIG. 3b illustrates the situation of FIG. 3a for user 1 and user 2 at a given point in time during the scheduled time resources. As described above in relation to FIGS. 1 and 2a-f, distortion from the transmission to user 1 leaks into adjacent frequency resources. In FIG. 3b, user 2, which is here scheduled to a lower frequency band than user 1, will experience distortion from user 1 at least at the upper band edge.

An alternative scheduling assignment which mitigates the distortion from user 1 is illustrated in relation to FIG. 3c. The sets of subcarriers have been separated in the frequency domain, thereby reducing or eliminating the distortion. This is further illustrated in FIG. 3d, where the separation in frequency is greater than the influence of the distortion, which, in this example, mainly leaks into adjacent frequencies.

Figures 4A, 4B:
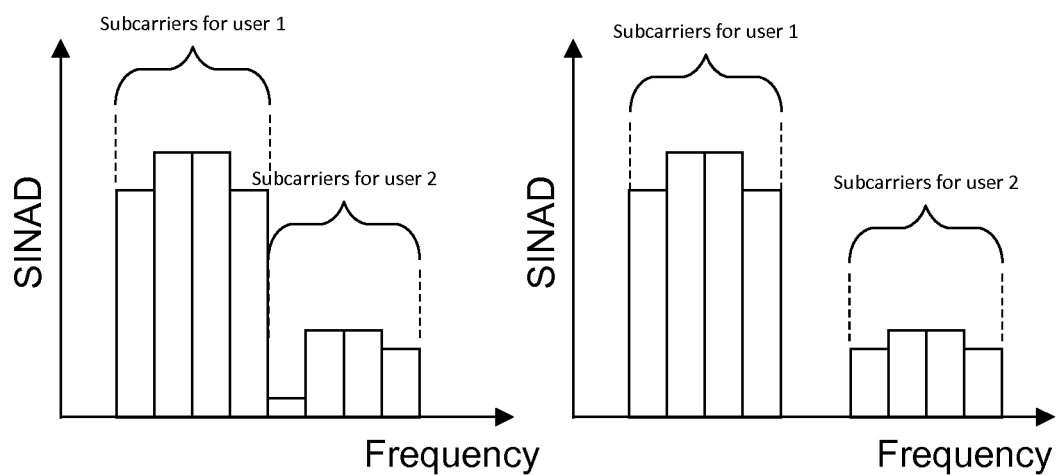
FIGS. 4 a-b illustrate signal to noise and distortion ratios for two different frequency scheduling assignments.

FIGS. 4a and 4b illustrate signal to noise and distortion ratios, SINADs, for two different frequency scheduling assignments for two different wireless devices. The frequency assignments may for instance be the frequency scheduling assignments discussed in relation to FIGS. 3a-d. In a first frequency scheduling assignment, illustrated to the left, two sets of four consecutive subcarriers are assigned adjacent to each other. FIG. 4 illustrates how distortion may be measured, which in turn may be used as a basis for deciding which set of frequency scheduling assignments for the two wireless devices is, e.g., the most favourable among different sets of frequency scheduling assignments. In the situation in FIG. 4a, distortion from the subcarrier at the upper end of the bandwidth for a strong signal, such as that to user 1 as described above, leaks into the subcarrier at the lower end of the bandwidth for a relatively weak signal, such as that to user 2 as described above. Relatively weakness of transmitted signal strengths may be determined by at least one ratio between SINADs of the signals to the two wireless devices. The subcarrier at the lower end of the bandwidth of user 2 experiences distortion which lowers the SINAD for that subcarrier. By choosing different frequency scheduling assignments for the two wireless devices, as illustrated in FIG. 4b, wherein the sets of consecutive carriers have been separated in frequency, the distortion between subcarriers at the nearest band edges can be reduced or eliminated, thereby improving the SINAD of the subcarrier at the lower end of the bandwidth of user 2.

Figure 5:
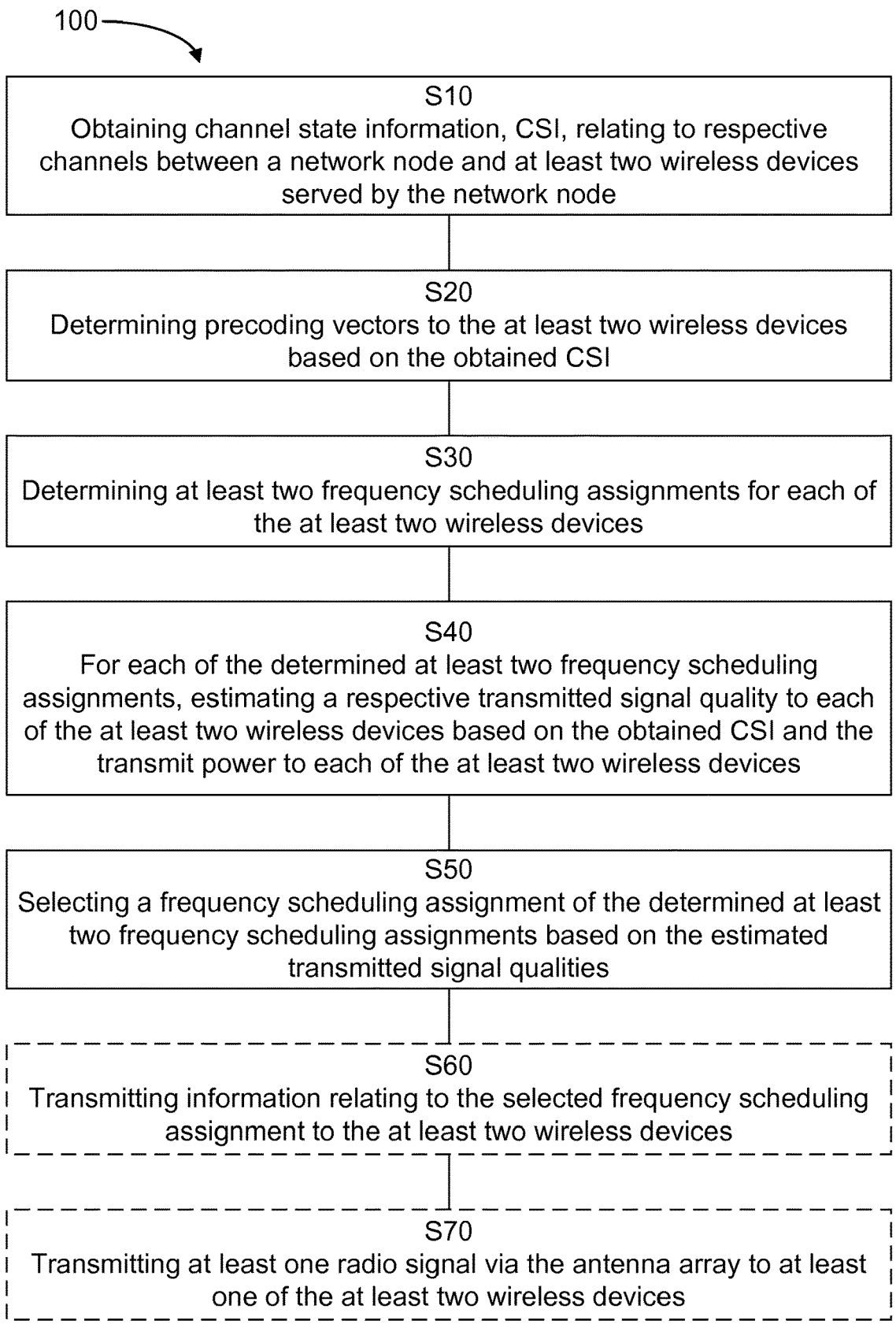
FIG. 5 illustrates method steps of the method for determining scheduling assignments for reducing nonlinear signal distortion according to the present disclosure.

FIG. 5 illustrates method steps of the method for determining scheduling assignments for reducing nonlinear signal distortion according to the present disclosure. The method is performed in a network node of a wireless communications network, wherein the network node comprises an antenna array arranged to perform beamforming. The method 100 comprises obtaining S10 channel state information, CSI, relating to respective channels between the network node and at least two wireless devices served by the network node. The obtained CSI may be full CSI or partial/limited CSI. Furthermore, the CSI may be obtained either as instantaneous CSI or as statistical CSI, or a combination thereof. For instance, CSI may be estimated based on channel correlation. The method 100 further comprises determining S20 precoding vectors to the at least two wireless devices based on the obtained CSI. With the first set of beams determined, the spatial resources for the respective scheduling assignments of the wireless device have been established. As described in relation to FIGS. 3a-d and 4, a frequency scheduling assignment for the respective wireless devices which separates the assigned frequency resources in such a way that distortion between transmissions to the wireless devices is reduced or eliminated. In order to be able to evaluate frequency scheduling assignments, comparisons between different frequency scheduling assignments need to be made. Thus, the method also comprises determining S30 at least two frequency scheduling assignments for each of the at least two wireless devices. The method additionally comprises estimating S40, for each of the determined at least two frequency scheduling assignments, a respective transmitted nonlinear signal distortion to each of the at least two wireless devices based on the obtained CSI. According to some aspects, the estimations are based on channel vectors, wherein the channel vectors are based on the CSI. The method yet further comprises selecting S50 a frequency scheduling assignment of the determined at least two frequency scheduling assignments based on the estimated transmitted nonlinear signal distortions. According to some aspects, the selection of frequency scheduling assignments is based on an estimation of which of the at least two frequency scheduling assignments give the highest throughput for one of the wireless devices. According to some further aspects, the highest throughput is taken for the wireless device for which the weakest transmit power is scheduled. According to some aspects, the highest throughput is taken for the wireless device for which a weakest signal to noise and distortion ratio is estimated.

The wireless devices may determine the selected frequency scheduling assignment by scanning the frequency band. However, it will usually be more efficient if each wireless device is informed of the selected frequency scheduling assignment. Thus, According to some aspects, the method further comprises transmitting S60 information relating to the selected frequency scheduling assignment to the at least two wireless devices. With the frequency scheduling assignment selected and the wireless devices being informed about it, the wireless devices will be ready to receive transmissions from the network node. Thus, according to some aspects, the method further comprises transmitting S70 at least one radio signal via the antenna array to at least one of the at least two wireless devices.

Figure 6:
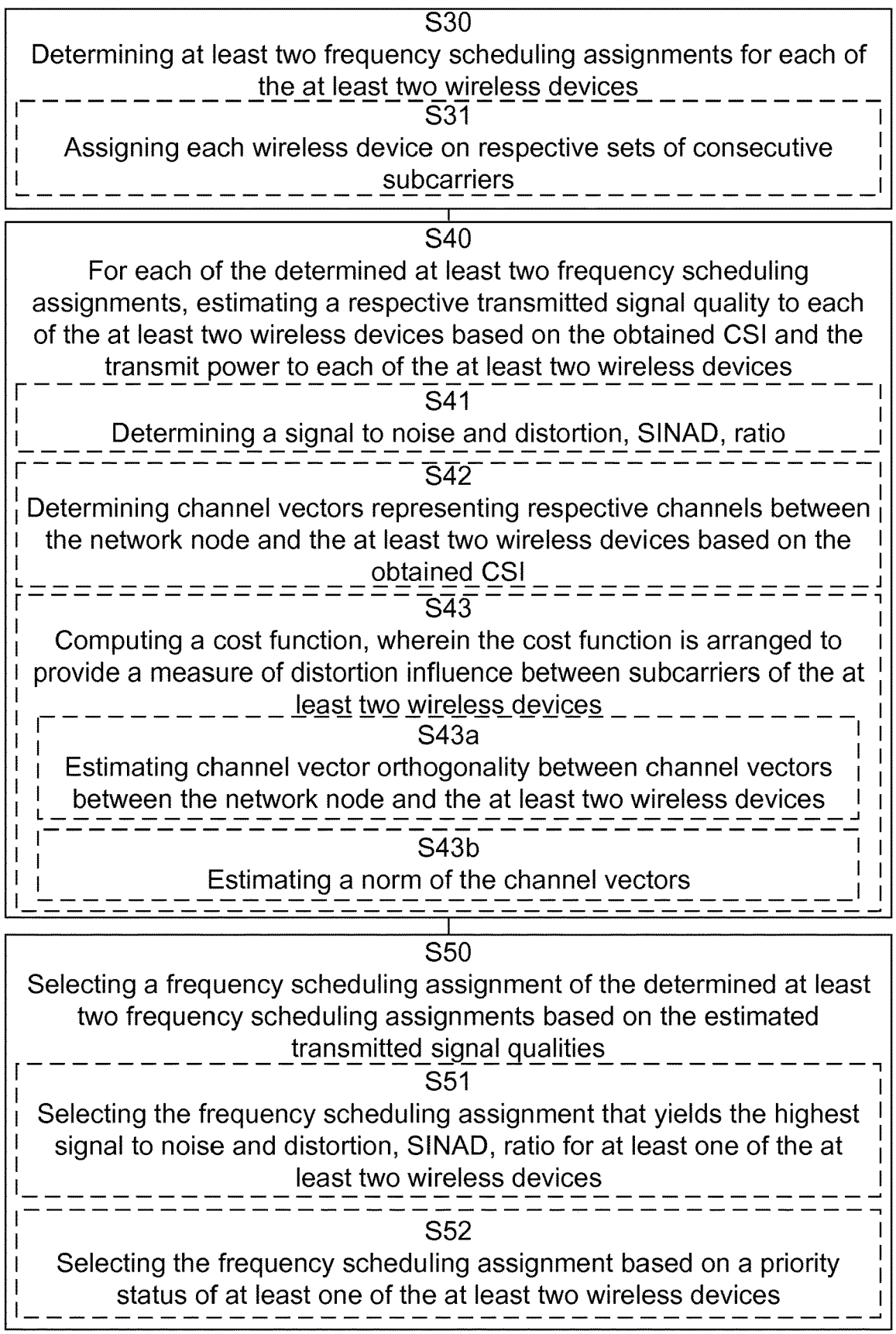
FIG. 6 illustrates further method steps of the method for determining scheduling assignments for reducing nonlinear signal distortion according to the present disclosure.

FIG. 6 illustrates further method steps of the method for determining scheduling assignments for reducing nonlinear signal distortion according to the present disclosure. In other words, FIG. 6 provides further details about the different possibilities available with respect to the method steps illustrated in FIG. 5.

According to some aspects, determining S30 at least two frequency scheduling assignments for each of the at least two wireless devices comprises assigning S31 each wireless device on respective sets of consecutive subcarriers. By grouping the subcarriers assigned to the respective wireless devices, distortion from transmission to one of the wireless devices will mainly influence adjacent subcarriers at the corresponding band edges. In other words, by assigning S31 each wireless device on respective sets of consecutive subcarriers, reduction of the distortion is facilitated since the main source of distortion will occur at respective band edges, which can be separated in frequency.

According to some aspects, estimating S40, for each of the determined at least two frequency scheduling assignments, a respective transmitted nonlinear signal distortion to each of the at least two wireless devices based on the obtained CSI comprises determining S41 a signal to noise and distortion, SINAD, ratio. The signal to noise and distortion ratio provides a measure of distortion for a given frequency scheduling which is quick and easy to estimate. Furthermore, SINAD, though it may be defined in different ways, is an established concept, and using it may facilitate the implementation of the disclosed method as well as providing a well-understood measure of the impact of nonlinear distortion for different frequency scheduling assignments.

According to some aspects, estimating S40, for each of the determined at least two frequency scheduling assignments, a respective transmitted nonlinear signal distortion to each of the at least two wireless devices based on the obtained CSI comprises determining S42 channel vectors representing respective channels between the network node and the at least two wireless devices based on the obtained CSI. The channel vectors provide means for estimating the influence of distortion between subcarriers.

According to some aspects, estimating S40, for each of the determined at least two frequency scheduling assignments, a respective transmitted nonlinear signal distortion to each of the at least two wireless devices based on the obtained CSI comprises computing S43 a cost function, wherein the cost function is arranged to provide a measure of distortion influence between subcarriers of the at least two wireless devices. Adopting a cost function enables evaluating the effects of nonlinear distortion of different frequency scheduling assignments. A cost function enables flexible tailoring of how the transmitted nonlinear signal distortion is estimated. Different cost functions may be provided for emphasis of how different aspects of the nonlinear distortion shall be prioritized or estimated. Being able to estimate the nonlinear signal distortion in different ways allows for different trade-offs between computational cost and desired accuracy. According to some further aspects, computing S43 the cost function comprises estimating S43a channel vector orthogonality between channel vectors between the network node and the at least two wireless devices. According to some further aspects, computing S43 the cost function comprises estimating S43b a norm of the channel vectors. Channel vector orthogonality and channel vector norms enable estimating how similar different channels are. The channel vector norms further enables normalizing cost function estimates, which facilitates comparisons between the effects of nonlinear distortion associated with different sets of determined frequency scheduling assignments.

According to some aspects, selecting S50 a frequency scheduling assignment comprises selecting S51 the frequency scheduling assignment that yields the highest signal to noise and distortion, SINAD, ratio for at least one of the at least two wireless devices. According to some aspects, selecting S50 a frequency scheduling assignment comprises selecting S52 the frequency scheduling assignment based on a priority status of at least one of the at least two wireless devices. In other words, the frequency scheduling assignments may be chosen to prioritize mitigation of nonlinear distortion caused by transmission to a first wireless device at a first power on transmission to a second wireless device at a second power lower than the first power, or a trade-off can be made between the priority status of at least one of the at least two wireless devices and the nonlinear distortion between the wireless devices.

An embodiment of the method is illustrated below. The illustrated embodiment will ensure that users with similar channels end up far from each other.

Denote the total number of subcarriers by N, and the number of users K, i.e. a network node is serving K wireless devices. Let user k be characterized by the triplet ($h_k[n]$, $N_k$, $\rho_k$), where $h_k[n]$ is its channel vector at subcarrier n, $N_k$ the number of subcarriers that should be allocated to that user and $\rho_k$ the transmit power to that user. For illustrative purposes, each user is scheduled on $N_k$ consecutive subcarriers. It is straightforward to extend the algorithm to non-consecutive subcarriers. Without loss of generality, we assume that the users are sorted such that $N_1 \geq N_2 \geq \ldots \geq N_K$. The allocation is characterized by $n_k^*$, the index of the first subcarrier that is allocated to user k.

A scheduling algorithm implementing an embodiment of the disclosed method may then be implemented as follows:

```
function SCHEDULE (N, {h₁[n], ..., h_K[n]}, {ρ₁, ..., ρ_K})
    Set n₁* = ... = n_{l-1}* = 1, for all users for whom N₁, ..., N_l = N.
    Set n_l* = 1 for user l.
    for user i ∈ [l + 1, K] do
        Compute the cost-function
```

$$c_i[n] = \sum_{n'=1}^{N} \sum_{k=1}^{i-1} \left(\frac{\rho_i}{\rho_k} + \frac{\rho_k}{\rho_i}\right) g[n' - n] g[n' - n_k^*] f(h_i[n'], h_k[n'])$$

```
    end for
    Set n_i* = argmin_n c_i[n].
end function
```

Information relating to the set of triplets $(h_k[n], N_k, \rho_k)$ is provided along with the total number of subcarriers by N, and the number of users K, wherein K may be determined by the size of the set of triplets. The total number of subcarriers N is known in advance. It is typically provided to the wireless node prior to operational use. The number of users K served by the network node may be determined based on the respective requests to be served by the network node. The channel vectors are determined based on the obtained S10 channel state information at the beginning of the method. The respective transmit powers are determined during the step of determining S20 precoding vectors to the wireless devices.

Users requiring the entire available frequency band are scheduled first. Next, a first user, i.e. a first wireless device, not requiring the entire available frequency band is chosen and allocated a subcarrier. Cost functions arranged to provide a measure of distortion influence between subcarriers are then estimated for subcarrier assignments of the remaining wireless devices with respect to the first wireless device. The wireless devices are assigned S31 on respective sets of consecutive subcarriers. The cost function is based on transmit powers on respective subcarriers, spectral masks for the respective subcarriers and a first function based on channel vectors for the respective subcarriers. According to some aspects, the first function is based on a measure of channel vector orthogonality according to $$f(h_i[n], h_k[n]) = \frac{\langle h_i[n], h_k[n] \rangle}{\|h_i\| \|h_k\|}$$

where $\langle h_i[n], h_k[n] \rangle = h_i^H[n] h_k[n]$ denotes the inner product between the two channel vectors.

In other words, determining at least two frequency scheduling assignments for each of the at least two wireless devices are determined S30 and for each of the determined at least two frequency scheduling assignments, a respective transmitted nonlinear signal distortion to each of the at least two wireless devices is estimated S40 based on the obtained CSI. Channel vectors representing respective channels between the network node and the at least two wireless devices are determined S42 based on the obtained CSI and a cost function is computed S43, wherein the cost function is arranged to provide a measure of distortion influence between subcarriers of the at least two wireless devices. Computing the cost function comprises estimating S43a channel vector orthogonality between channel vectors between the network node and the at least two wireless devices, and estimating S43b a norm of the channel vectors.

Wireless devices are then assigned subcarriers based on which assignment is estimated by the cost function to provide the least amount on nonlinear distortion. In other words, the method comprises selecting S50 a frequency scheduling assignment of the determined at least two frequency scheduling assignments based on the estimated transmitted nonlinear signal distortions.

Figure 7:
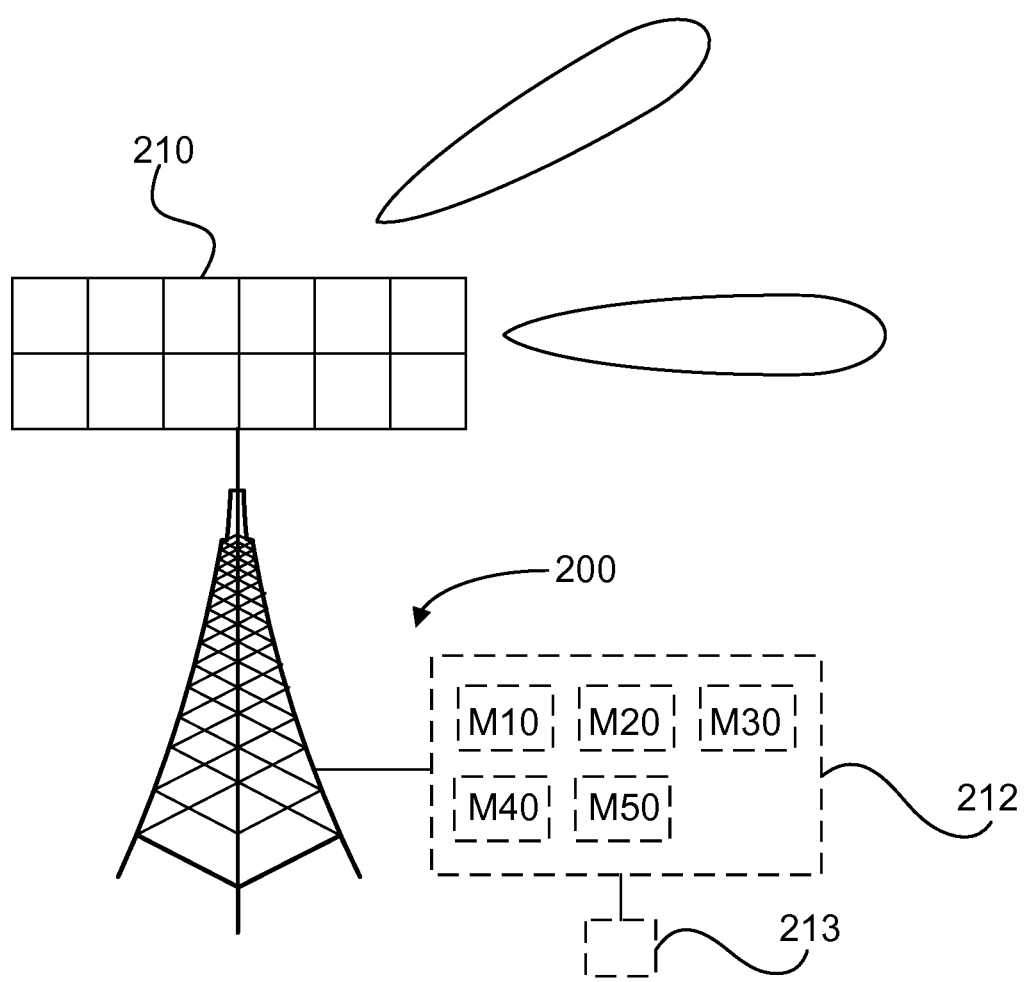
FIG. 7 illustrates a network node of a wireless communications network according to the present disclosure.

FIG. 7 illustrates a network node 200 of a wireless communications network according to the present disclosure. The network node 200 comprises an antenna array 210 arranged to perform beamforming. The network node is arranged to carry out the method for determining scheduling assignments for reducing self-interference as described above and below.

According to some aspects, the network node 200 comprises processing circuitry 212. The processing circuitry 212 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry 212 need not be provided as a single unit but may be provided as any number of units or circuitry.

According to some aspects the processing circuitry 212 comprises modules configured to perform the methods described above and below. The modules are implemented in hardware or in software or in a combination thereof. The modules are according to one aspect implemented as a computer program stored in a memory 213 which run on the processing circuitry 212.

Hence, according to some aspects, the processing circuitry 212 comprises an obtaining module M10 arranged to obtain channel state information, CSI, relating to respective channels between the network node and at least two wireless devices served by the network node. The processing circuitry 212 further comprises a precoding vector determining module M20 arranged to determine precoding vectors to the at least two wireless devices based on the obtained CSI. The processing circuitry 212 also comprises a frequency scheduling assignment determining module M30 arranged to determine at least two frequency scheduling assignments for each of the at least two wireless devices. The processing circuitry 212 additionally comprises an estimation module M40 arranged to, for each of the determined at least two frequency scheduling assignments, estimate a respective transmitted nonlinear signal distortion to each of the at least two wireless devices based on the obtained CSI. The processing circuitry 212 yet further comprises a selecting module M50 arranged to select a frequency scheduling assignment of the determined at least two frequency scheduling assignments based on the estimated transmitted nonlinear signal distortions.

The present disclosure also relates to computer programs comprising computer code which, when executed, causes a network node as described above and below to carry out the method for determining scheduling assignments for reducing self-interference as described above and below.

The invention claimed is:

1. A method, performed in a network node of a wireless communications network, for determining scheduling assignments for reducing nonlinear signal distortion; the network node comprising an antenna array configured to perform beamforming; the method comprising:
    obtaining channel state information (CSI) relating to respective channels between the network node and at least two wireless devices served by the network node;

determining precoding vectors to the at least two wireless devices based on the obtained CSI;

determining at least two frequency scheduling assignments for each of the at least two wireless devices;

for each of the determined at least two frequency scheduling assignments, estimating a respective transmitted nonlinear signal distortion to each of the at least two wireless devices based on the obtained CSI, wherein the estimating comprises computing a cost function based on channel vectors representing respective channels between the network node and the at least two wireless devices, and wherein computing the cost function comprises estimating a norm of the channel vectors; and selecting a frequency scheduling assignment of the determined at least two frequency scheduling assignments based on the estimated transmitted nonlinear signal distortions.

2. The method of claim 1, wherein the estimating the respective transmitted nonlinear signal distortion comprises determining a signal to noise and distortion (SINAD) ratio.

3. The method of claim 1, wherein the selecting a frequency scheduling assignment comprises selecting the frequency scheduling assignment that yields the highest signal to noise and distortion (SINAD) ratio for at least one of the at least two wireless devices.

4. The method of claim 1, wherein the selecting a frequency scheduling assignment comprises selecting the frequency scheduling assignment based on a priority status of at least one of the at least two wireless devices.

5. The method of claim 1, further comprising transmitting information relating to the selected frequency scheduling assignment to the at least two wireless devices.

6. The method of claim 1, wherein the estimating the respective transmitted nonlinear signal distortion comprises determining channel vectors representing respective channels between the network node and the at least two wireless devices based on the obtained CSI.

7. The method of claim 1, wherein the cost function provides a measure of distortion influence between subcarriers of the at least two wireless devices.

8. The method of claim 7, wherein the cost function is based on:
channel vectors representing respective channels between the network node and the at least two wireless devices;
spectral masks for the at least two frequency scheduling assignments for the at least two wireless devices; and/or
the transmit power to the at least two wireless devices.

9. The method of claim 7, wherein computing the cost function comprises estimating channel vector orthogonality between channel vectors between the network node and the at least two wireless devices.

10. The method of claim 1, wherein the determining the at least two frequency scheduling assignments comprises assigning each wireless device on respective sets of consecutive subcarriers.

11. The method of claim 1, further comprising transmitting at least one radio signal via the antenna array to at least one of the at least two wireless devices.

12. A network node of a wireless communications network, the network node comprising:
an antenna array arranged to perform beamforming and to receive channel state information (CSI) relating to respective channels between the network node and at least two wireless devices served by the network node; and
processing circuitry operative to determine scheduling assignments for reducing self-interference by:
determining precoding vectors to the at least two wireless devices based on the obtained CSI;
determining at least two frequency scheduling assignments for each of the at least two wireless devices;
for each of the determined at least two frequency scheduling assignments, estimating a respective transmitted nonlinear signal distortion to each of the at least two wireless devices based on the obtained CSI, wherein the estimating comprises computing a cost function based on channel vectors representing respective channels between the network node and the at least two wireless devices, and wherein computing the cost function comprises estimating a norm of the channel vectors; and
selecting a frequency scheduling assignment of the determined at least two frequency scheduling assignments based on the estimated transmitted nonlinear signal distortions.

13. A non-transitory computer readable recording medium storing a computer program product for controlling a network node for determining scheduling assignments for reducing nonlinear signal distortion; the network node comprising an antenna array configured to perform beamforming; the computer program product comprising software instructions which, when run on processing circuitry of the network node, causes the network node to:
obtain channel state information (CSI) relating to respective channels between the network node and at least two wireless devices served by the network node;
determine precoding vectors to the at least two wireless devices based on the obtained CSI;
determine at least two frequency scheduling assignments for each of the at least two wireless devices;
for each of the determined at least two frequency scheduling assignments, estimate a respective transmitted nonlinear signal distortion to each of the at least two wireless devices based on the obtained CSI, wherein to estimate the respective transmitted nonlinear signal distortion to each of the at least two wireless devices, the software instructions, when run on the processing circuitry of the network node, further configure the network node to compute a cost function based on channel vectors representing respective channels between the network node and the at least two wireless devices, and wherein to compute the cost function, the software instructions, when run on the processing circuitry of the network node, further configure the network node to estimate a norm of the channel vectors; and
select a frequency scheduling assignment of the determined at least two frequency scheduling assignments based on the estimated transmitted nonlinear signal distortions.

* * * * *